US005488351A

United States Patent [19]

Hedayatnia et al.

[11] Patent Number: 5,488,351

[45] Date of Patent: Jan. 30, 1996

[54] ROCKING VIBRATOR ALERT APPARATUS DRIVEN BY OPPOSITE PHASES OF A FREQUENCY GENERATOR

[75] Inventors: Mostafa Hedayatnia; Margaret Graham-Meighan, both of Boynton Beach, Fla.

[73] Assignee: Motorola, Inc., Schaumburg, Ill.

[21] Appl. No.: 100,813

[22] Filed: Aug. 2, 1993

[51] Int. Cl.[6] .......... H04Q 1/30

[52] U.S. Cl. .......... 340/407.1; 340/311.1; 340/825.44; 340/825.46; 310/311

[58] Field of Search .......... 340/825.44, 311.1, 340/407.1, 635, 691, 692, 825.46; 310/311, 328, 330, 331

[56] References Cited

U.S. PATENT DOCUMENTS

| | | | |
|---|---|---|---|
| H1,173 | 4/1993 | Davis et al. | 340/825.44 |
| 2,513,899 | 7/1950 | Taylor | 310/330 X |
| 3,336,529 | 8/1967 | Tygart | 324/173 |
| 3,445,843 | 5/1969 | Pena | 340/401.1 |
| 5,172,092 | 12/1992 | Nguyen et al. | 340/311.1 |

OTHER PUBLICATIONS

4[re] Congr'es Européen de Chronométrie, 29–30 Oct. 1992, entitled "Development of Ultrasonic Motor and Application to Silent Alarm Analog Quartz Watch" issued to Masao Kasuga et al.

*Primary Examiner*—Brent A. Swarthout
*Assistant Examiner*—Edward Lefkowitz
*Attorney, Agent, or Firm*—D. Andrew Floam

[57] ABSTRACT

A miniature vibrator (50) for a wrist (10) worn alerting device (20) such as a pager produces a rocking motion vibratory alert. The vibrator (50) has a pair of cantilevered piezoelectric resonant vibrators (62, 64, 66 and 72, 74, 76) which are driven by separate drivers (34, 38) at a frequency determined by a frequency generator (32) but at opposite phases because of an inverter (36). Since the vibrating masses (64, 74) move in opposite directions (200, 210), translational movement of the alerting device (20) is substantially eliminated and a resulting rocking motion produces an improved vibratory sensation on the wrist (10) of the user. Additionally, driving the resonant vibrators (62, 64, 66 and 72, 74, 76) at opposite phases results in reduced surge currents (150) on the battery (40).

11 Claims, 1 Drawing Sheet

ROCKING VIBRATOR ALERT APPARATUS DRIVEN BY OPPOSITE PHASES OF A FREQUENCY GENERATOR

FIELD OF THE INVENTION

This invention generally relates to alerting devices for portable receivers, and more particularly to vibratory alerting devices for portable receivers.

BACKGROUND OF THE INVENTION

Vibratory alerts in a wrist worn alerting device are useful in providing the user with an alert indication without a disturbing audio interruption. Such a wrist worn alerting device includes a wrist worn pager.

Conventional vibratory alerting devices have limitations which make them undesirable for use in wrist worn pagers. For example, the size of a motor necessary to drive a rotating eccentric weight vibrator is often too large to be placed in a wrist worn pager. Additionally, the current drawn by such a motor is often too great for the types of miniature batteries available for a wrist worn device.

A resonant vibrator which has a cantilevered structure supporting a vibrating mass may fit better within a wrist worn pager. Such devices include piezoelectric vibrators. However, such devices induce a pulsating current on the miniature battery powering the device, the pulsating current can cause battery voltage surges which can cause other circuits in the wrist worn pager to malfunction. Additionally, the vibrational sensation experienced by the user of such wrist worn devices may not provide enough sensation for the user to detect the alert.

Thus, what is needed is a miniature vibratory alerting device having a substantially constant current drain and an improved vibrational sensation.

SUMMARY OF THE INVENTION

In accordance with the present invention, a vibrator for generating a vibratory alert comprises a first vibrating member oscillating at a first frequency and at a first phase and producing a first oscillating moment upon a housing, the first oscillating moment having a first magnitude orientated along a first axis. The vibrator further comprises a second vibrating member oscillating at the first frequency and at a second phase and producing a second oscillating moment upon the housing, the second oscillating moment having a second magnitude orientated along a second axis. These elements cooperate such that the second phase is substantially inverted from the first phase, the second axis is substantially parallel to the first axis, and the first oscillating moment and the second oscillating moment combine to produce a total oscillating moment having a magnitude greater than either the first magnitude or the second magnitude.

DESCRIPTION OF THE INVENTION

Figure 1:
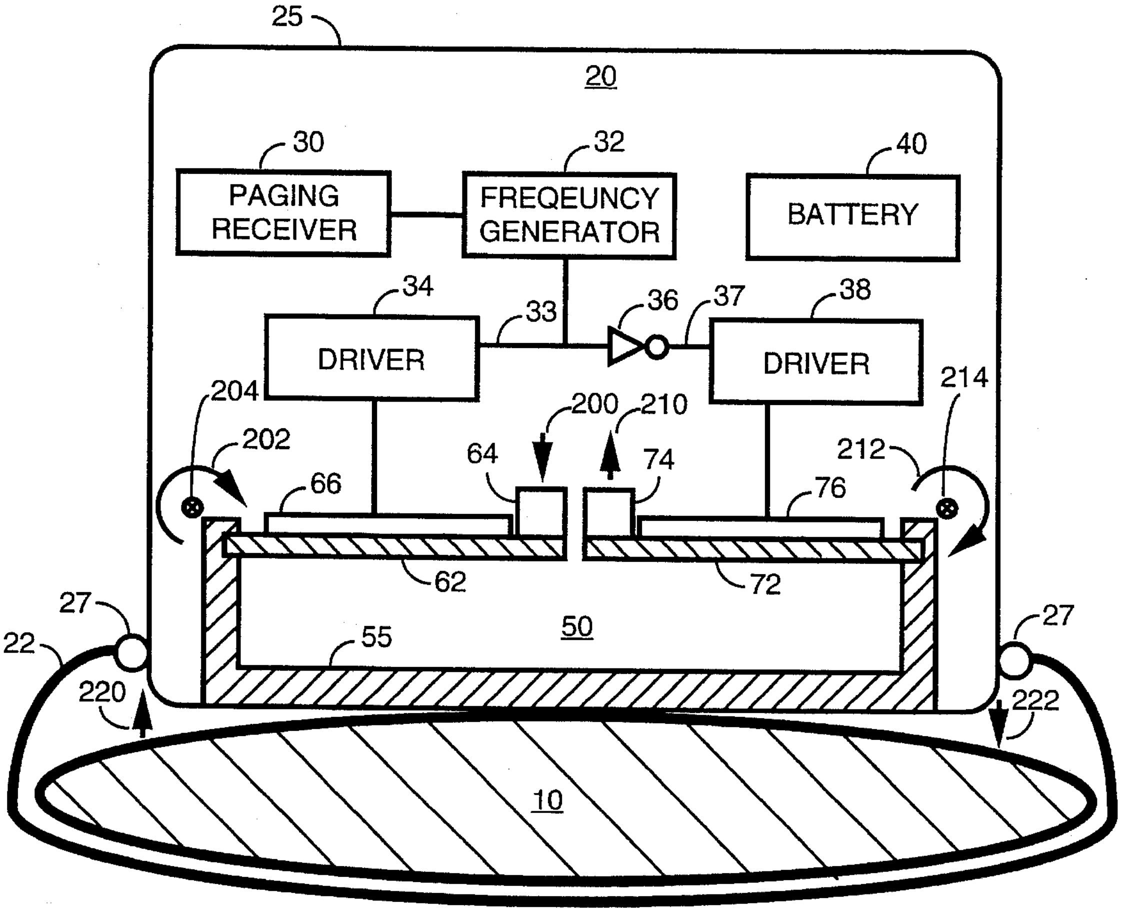
FIG. 1 shows a combination block diagram and cross sectional view of a device operating in accordance with a preferred embodiment of the present invention.

FIG. 1 shows a combination block diagram and cross sectional view of a device operating in accordance with a preferred embodiment of the present invention. The wrist of a user 10 has attached to it a wrist worn alerting device such as a pager 20. A wrist band 22 attached to a housing 25 of the pager 20 by pivot joints 27, secures the pager 20 to the user's wrist 10. Within the pager 20 is a paging receiver 30 which receives RF modulated paging signals and generates a vibratory alert signal in response to the reception of a page for the user. The alert signal may also be generated in response to other alarm functions generated by the paging receiver 30, such as a time of day alarm. The paging receiver 30 may include a microprocessor for both the processing of paging signals and for generating the other alarm functions.

When the vibratory alert signal is generated, the frequency generator 32 generates a square wave signal on node 33. The frequency of the square wave signal is preferably substantially between 150 Hz and 160 Hz. The square wave signal is applied to a driver 34, and also to an inverter 36. The inverter 36 outputs a signal which has the same frequency and an inverted phase. The inverted square wave signal on node 37 is then applied to a driver 38. The drivers 34 and 38 convert power from a battery 40 lot use by a vibrator 50. In the preferred embodiment, the vibrator is a piezoelectric device and the drivers 34 and 38 includes switched reactive elements to multiply the battery voltage to a voltage sufficient to drive the vibrator 50. In alternate embodiments, in place of the piezoelectric elements, a vibrator could use electromagnetic or other equivalent forms of electromechanical energy conversion. When switched in response to the frequency generator 32, the drivers 34 and 38 provide alternating multiplied voltages to piezoelectric elements 66 and 76 having a frequency equal to the frequency of the frequency of the square wave signal while having opposite phases due to the inversion of the inverter 36.

The vibrator 50 has a pair of cantilevered structures fixed to a vibrator housing 55. The first cantilevered structure has a first resilient member 62 affixed at a first end to the vibrator housing 55. A first mass 64 is affixed at a second end of the first resilient member 62. A first piezoelectric element 66 is affixed to a flat surface of the first resilient member 62 between its first and second ends. The second cantilevered structure has a second resilient member 72 affixed at a third end to the vibrator housing 55. A second mass 74 is affixed at a fourth end of the second resilient member 72. A second piezoelectric element 76 is affixed to a flat surface of the second resilient member 72 between its third and fourth ends.

In operation, alternating voltages front the drivers 34 and 38 are applied to the piezoelectric elements 66 and 76 to lengthen the piezoelectric elements 66 and 76 when the multiplied voltage is applied, and to shorten them in the absence of the multiplied voltage. This produces slight longitudinal variations on the resilient members 62 and 72, and results in oscillation of the resilient members 62 and 72 and the affixed masses 64 and 74.

Figure 2:
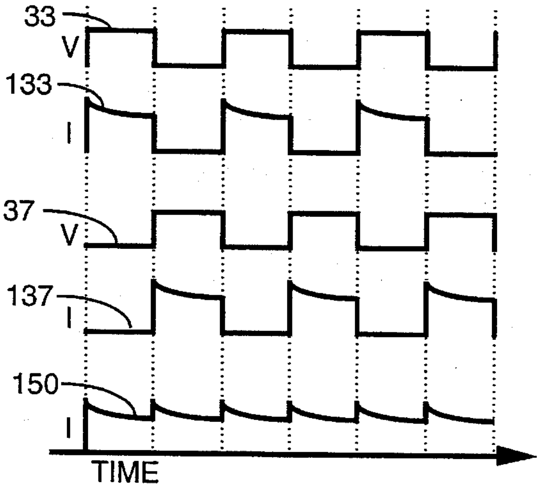
FIG. 2 shows timing diagrams and current drain waveforms of a vibrator operating in accordance with the preferred embodiment of the present invention.

FIG. 2 shows timing diagrams and current drain waveforms of the vibrator operating in accordance a with a preferred embodiment of the present invention. Square wave 33 represents the voltage signal produced by the frequency generator 32 on node 33, and inverted square wave 37 represents the voltage signal produced at the output of the inverter 36 at node 37. The power drawn by the driver 34 is represented by the waveform of line 133. Line 133 shows that current is drawn from the battery 40 during a high interval of square wave 33 and substantially no current is drawn during a low interval of square wave 33. The power drawn by the driver 38 is represented by the waveform of line 137. Line 137 shows that current is drawn from the battery 40 during a high interval of square wave 37 and that substantially no current is drawn during a low interval of square wave 37. The waveform of line 150 shows the current drawn from the battery 40 by both drivers 34 and 38. The peaks shown in waveforms 133, 137 and 150 may be exaggerated depending upon the precise circuitry used in drivers 34 and 38. With alternate driver circuitry, the shapes of these waveforms may be altered significantly without departing from the advantages of the invention.

Line 150 shows that the combined current drawn by the vibrator is substantially constant during the vibratory alert. Since the typical battery 40 used in a miniature wrist worn pager 20 tends to have high internal impedance at various stages of its life, large current surges can result in substantial voltage ripple on the output of battery 40. The voltage ripple may be sufficient to cause an undesirable malfunction of the circuits within the paging receiver 30. For example, the voltage ripple may interfere with the reception of the RF signal, or cause low voltage digital circuits to malfunction. Note that the waveform of either of lines 133 or 137, when considered alone, represents large pulsating current surges resulting from driving a single element piezoelectric vibrator. Use of a single element piezoelectric vibrator could be a typical application for a wrist worn alerting device. However, by combining two piezoelectric vibrating elements and inverting the phase of the drive signal, the surges of current drawn from the battery 40 are substantially reduced. This results in substantially less ripple on the battery voltage. The ripple may be further reduced by additional filtering of the battery power supply. The reduced surges result in a more robust pager design which is less likely to malfunction during the generation of a vibratory alert.

Referring back to FIG. 1, FIG. 1 shows the operation of the vibrator 50 at a single point in time of a vibratory alert. The driver 34 is applying a multiplied voltage to the first piezoelectric element 66. The elongation of the piezoelectric element 66 accelerates the first resilient member 62 and the first mass 64 in a downward direction as shown by arrow 200. This results in a moment of inertia 202 being placed on the vibrator housing 55 where the first resilient member 62 is attached. Using the right hand rule, a first resulting moment vector 204 has a first axis which is perpendicular to the page with a direction going into the page. The magnitude of the moment is partly a function of the first mass 64, and its acceleration. At the same point in time, the driver 38 has ceased application of a multiplied voltage to the second piezoelectric element 76. The second resilient member 72, acting as a restoring leaf spring, accelerates the second mass 74 in an upward direction as shown by arrow 210. The movement of the second mass 74 results in a second moment of inertia 212 being placed on the vibrator housing 55 where the second resilient member 72 is attached. Using the right hand rule, a resulting second moment vector 214 has a second axis which is perpendicular to the page with a direction going into the page. The magnitude of the moment of the second vector 214 is partly a function of the second mass 74, and its acceleration.

Since both the axis of the first moment vector 204 and the axis of the second moment vector 214 are perpendicular to the page, the first axis is substantially parallel to the second axis. Furthermore, since both vectors 204 and 214 have the same direction, the magnitude of the moments combine to produce a total moment on the vibrator housing greater in magnitude than either moment of independent vectors 204 and 214. It can be appreciated, that as the drivers 34 and 38 alternate voltages, directions 200 and 210 reverse, moments 202 and 212 reverse, and the direction of moment vectors 204 and 214 reverse. However, the axis of moment vectors 204 and 214 remain perpendicular to the page and parallel to each other, thereby providing for the continued combining of the magnitude of moments 202 and 212 in the reverse mode.

The vibrator housing 55 is mechanically attached to the pager housing 25, thereby transferring the total moment to the pager housing 25. The resulting moment causes one end of the pager housing 25 to lift away from the wrist 10 of the user, see arrow 220, while the other end moves towards the wrist 10 of the user, see arrow 222. As the drivers 34 and 38 alternate, directions 220 and 222 also alternate. In operation this results in a rocking motion of the pager 20 upon the wrist 10 of the user. The rocking motion results in an improved sensation of the vibratory alert. Note that pivot joints 27 further facilitate the rocking Note further that since at any given time, masses 64 and 74 are moving in opposite directions, translational movement of the pager housing 25 is substantially eliminated. If only one vibrating piezoelectric vibrator were used the resulting motion would consist at least partly of translational movement of the entire pager housing 25 towards and away from the wrist 10 of the user in response to a single moving mass. This translational type of vibratory alert has a reduced sensory effect on the wrist of the user. By adding a second oscillating element inverted in phase, the translational movement of the entire pager housing 25 is substantially eliminated because masses 64 and 74 are moving in opposite directions and their translational effects cancel. The moment axes need not be parallel to accomplish this end. By having two masses moving in opposite directions, translational movement is converted into a rocking motion which results in more user sensation of the vibratory alert.

Figure 3:
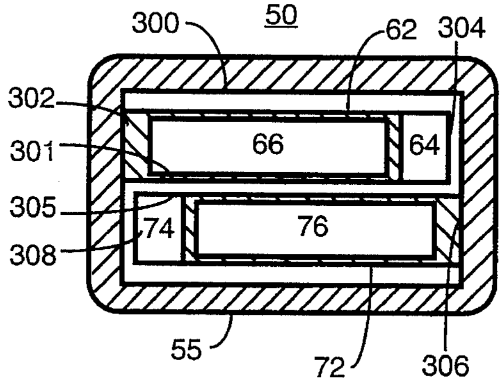
FIG. 3 shows a top view of a miniaturized version of the vibrator shown in FIG. 1. in accordance with the preferred embodiment of the present invention.

FIG. 3 shows a top plan view of a miniaturized version of the vibrator 50 shown in FIG. 1. in accordance with a preferred embodiment of the present invention. The housing has a length dimension 300 substantially long enough to accommodate the vibrating cantilevered structures. FIG. 3 shows a miniature vibrator comprising a first vibrating cantilevered structure 62, 64, and 66 having a side 301 having a first length slightly shorter than length 300 and affixed at a first end 302 to the vibrator housing 55 and free to vibrate at the second end 304, and a second vibrating cantilevered structure 72, 74, 76 having a second side having a second length substantially equal to the first length, and affixed at a third end 306 to the vibrator housing 55 and free to vibrate at a fourth end 308. The elements cooperate such that the first side 301 is substantially adjacent to and in close proximity with the second side 305, and the first end 302 is substantially adjacent to the fourth end 308, and the second end 304 is substantially adjacent to the third end 306. This arrangement allows for miniaturization of a vibrator having two vibrating cantilevered structures.

In alternate embodiments of the invention, the vibrator may be used in other portable vibratory alerting devices such as belt worn pagers, wrist watches, credit card shaped pagers, portable telephones and other miniature electronic devices.

Thus, what is provided is a miniature vibratory alerting device having a substantially constant current drain and an improved rocking vibrational sensation.

We claim:

1. A vibrator for generating a vibratory alert, the vibrator comprising:

a first vibrating member oscillating at a first frequency and at a first phase and producing a first oscillating moment upon a housing, the first oscillating moment having a first magnitude orientated along a first axis; and a second vibrating member oscillating at the first frequency and at a second phase and producing a second oscillating moment upon the housing, the second oscillating moment having a second magnitude orientated along a second axis, wherein the second phase is substantially inverted from the first phase, the second axis is substantially parallel to the first axis, and the first oscillating moment and the second oscillating moment combine to produce a total oscillating moment having a magnitude greater than either the first magnitude or the second magnitude.

2. The vibrator according to claim 1 further comprising:

a battery supply for driving the vibrator, and wherein said first vibrating member consumes power from said battery during a first portion of a cycle of the first frequency and draws substantially no power from said battery during a second portion of the cycle of the first frequency, and said second vibrating member consumes power from said battery during the second portion of the cycle of the first frequency, and draws substantially no power from said battery during the first portion of the cycle of the first frequency.

3. The vibrator according to claim 1 wherein said first vibrating member includes:

a first resilient member having first and second ends, the first end affixed to the housing;

a first mass affixed at the second end of said first resilient member; and a first piezoelectric element affixed to said first resilient member between the first and second ends of said first resilient member, wherein said first vibrating member oscillates in response to driving said first piezoelectric element with a first alternating electrical signal having a frequency and a phase equal to the first frequency and the first phase.

4. The vibrator according to claim 3 wherein said second vibrating member includes:

a second resilient member having first and second ends, the first end affixed to the housing;

a second mass affixed at the second end of said second resilient member; and a second piezoelectric element affixed to said second resilient member between the first end and the second end of said second resilient member, wherein said second vibrating member oscillates in response to driving said second piezoelectric element with a second alternating electrical signal having a frequency and a phase equal to the first frequency and the second phase.

5. The vibrator according to claim 1 further comprising:

a frequency generator for generating the first frequency at the first phase;

a first driver coupled to said frequency generator and said first vibrating member for electrically driving said first vibrating member at the first frequency and the first phase;

an inverter coupled to said frequency generator for generating the first frequency at the second phase; and a second driver coupled to said inverter and said second vibrating member for electrically driving said second vibrating member at the first frequency and the second phase.

6. The vibrator according to claim 1 wherein the vibrator is included within an alerting device worn on a wrist of a human user, and wherein the total oscillating movement causes the alerting device to substantially rock back and forth on the wrist of the human user, thereby generating a rocking vibratory alert.

7. The vibrator according to claim 6 wherein the alerting device is a paging receiver.

8. A pager comprising the vibrator of claim 1.

9. A vibrator for generating a vibratory alert, the vibrator comprising:

an electrical power supply for driving the vibrator;

a first vibrating member oscillating at a first frequency and at a first phase and producing a first oscillating moment upon a housing, the first oscillating moment having a first magnitude orientated along a first axis; and a second vibrating member oscillating at the first frequency and at a second phase and producing a second oscillating moment upon the housing, the second oscillating moment having a second magnitude orientated along a second axis, wherein said first vibrating member consumes power from said electrical power supply during a first portion of a cycle of the first frequency and draws substantially no power from said electrical power supply during a second portion of the cycle of the first frequency, the second phase is substantially inverted from the first phase, and said second vibrating member consumes power from said electrical power supply during the second portion of the cycle of the first frequency, and draws substantially no power from said electrical power supply during the first portion of the cycle of the first frequency.

10. The vibrator according to claim 9 wherein said electrical power supply comprises a battery.

11. The vibrator according to claim 9 wherein the second axis is substantially parallel to the first axis, and the first oscillating moment and the second oscillating moment combine to produce a total oscillating moment having a magnitude greater than either the first magnitude or the second magnitude.

* * * * *